(12) United States Patent
Inoue et al.

(10) Patent No.: US 12,286,516 B2
(45) Date of Patent: *Apr. 29, 2025

(54) FILM ROLL OF HEAT-SHRINKABLE POLYESTER

(71) Applicant: TOYOBO CO., LTD., Osaka (JP)

(72) Inventors: Masafumi Inoue, Tsuruga (JP); Masayuki Haruta, Tsuruga (JP)

(73) Assignee: TOYOBO CO., LTD., Osaka (JP)

(*) Notice: Subject to any disclaimer, the term of this patent is extended or adjusted under 35 U.S.C. 154(b) by 353 days.

This patent is subject to a terminal disclaimer.

(21) Appl. No.: 17/765,525

(22) PCT Filed: Sep. 23, 2020

(86) PCT No.: PCT/JP2020/035696
§ 371 (c)(1),
(2) Date: Mar. 31, 2022

(87) PCT Pub. No.: WO2021/065596
PCT Pub. Date: Apr. 8, 2021

(65) Prior Publication Data
US 2022/0267541 A1 Aug. 25, 2022

(30) Foreign Application Priority Data
Oct. 2, 2019 (JP) .................................. 2019-182017

(51) Int. Cl.
| B29C 55/06 | (2006.01) |
| B29C 55/14 | (2006.01) |
| B29C 61/02 | (2006.01) |
| B65H 75/10 | (2006.01) |
| C08J 5/18 | (2006.01) |

(52) U.S. Cl.
CPC ............. *C08J 5/18* (2013.01); *B29C 55/06* (2013.01); *B29C 55/14* (2013.01); *B29C 61/02* (2013.01); *B65H 75/10* (2013.01); *C08J 2367/00* (2013.01)

(58) Field of Classification Search
None
See application file for complete search history.

(56) References Cited

U.S. PATENT DOCUMENTS

| 6,451,445 B1* | 9/2002 | Ito ....................... B29C 61/003 264/177.17 |
| 6,458,437 B1* | 10/2002 | Ito ....................... C08L 67/02 525/425 |
| 6,548,595 B2* | 4/2003 | Ito ....................... B29C 61/003 524/604 |
| 8,728,594 B2 | 5/2014 | Haruta et al. |
| 11,524,858 B2 | 12/2022 | Haruta et al. |
| 2009/0270584 A1 | 10/2009 | Endo et al. |
| 2009/0304997 A1 | 12/2009 | Haruta et al. |
| 2010/0260951 A1 | 10/2010 | Haruta et al. |
| 2011/0008607 A1 | 1/2011 | Haruta et al. |
| 2013/0008821 A1* | 1/2013 | Haruta ....................... C08J 5/18 528/308.1 |
| 2019/0169386 A1 | 6/2019 | Inoue et al. |
| 2021/0061605 A1 | 3/2021 | Haruta et al. |

FOREIGN PATENT DOCUMENTS

| CN | 109563284 A | 4/2019 |
| EP | 2639044 A2 | 9/2013 |
| JP | 2003-266525 A | 9/2003 |
| JP | 2004-203545 A | 7/2004 |
| JP | 3678220 B2 | 8/2005 |
| JP | 2007-262365 A | 10/2007 |
| JP | 2008-195061 A | 8/2008 |
| JP | 2014-073688 A | 4/2014 |
| JP | 2017-024382 A | 2/2017 |
| WO | 2019/151196 A1 | 8/2019 |

OTHER PUBLICATIONS

China National Intellectual Property Administration, First Office Action in Chinese Patent Application No. 202080069154.X (Apr. 21, 2023).
Converting Technical Institute, "3. Possible Problems in Winding and Corrective Measures," *The Slitter-Rewinder Technical Reading Book*, pp. 15-21 (1998).
Japanese Patent Office, International Search Report in International Patent Application No. PCT/JP2020/035696 (Nov. 17, 2020).
China National Intellectual Property Administration, Second Office Action in Chinese Patent Application No. 202080069154.X (Nov. 3, 2023).
European Patent Office, Extended European Search Report in European Patent Application No. 20873198.4 (Nov. 3, 2023).
China National Intellectual Property Administration, The First Office Action in Chinese Patent Application No. 201980010081.4 (Aug. 5, 2021).
China National Intellectual Property Administration, Decision of Rejection in Chinese Patent Application No. 201980010081.4 (Apr. 25, 2022).
China National Intellectual Property Administration, Office Action in Chinese Patent Application No. 202080069154.X (Mar. 14, 2024).

(Continued)

*Primary Examiner* — Yung-Sheng M Tsui
(74) *Attorney, Agent, or Firm* — Leydig, Voit & Mayer, Ltd.

(57) ABSTRACT

The invention provides a heat-shrinkable polyester film roll obtained by winding a heat-shrinkable polyester film on a paper tube with primary shrinkage in the longitudinal direction and a shrinkage rate of 40% or more, wherein the film has a winding length of 1000 to 30000 m, a width of 50 to 1500 mm, and a thickness of 5-30 μm, the thickness irregularity of the film roll in the width direction is 20% or less, the paper tube has an inner diameter of 3 inches with a 0.5 mm or less difference in clearance and a 1700 N/100 mm or more flat compressive strength in the width direction after the film is removed from the film roll, the mean value of the winding hardness of the surface layer part of the film roll in the width direction is 500-850, and the natural shrinkage rate in the longitudinal direction is 2.0% or less.

8 Claims, No Drawings

(56) References Cited

OTHER PUBLICATIONS

European Patent Office, Extended European Search Report in European Patent Application No. 19748240.9 (Oct. 1, 2021).
Indian Patent Office, Examination Report in Indian Patent Application No. 202047034464 (Dec. 20, 2021).
Japan Patent Office, International Search Report in International Patent Application No. PCT/JP2019/002800 (Apr. 23, 2019).
Korean Intellectual Property Office, Office Action in Korean Patent Application No. 10-2020-7022255 (Nov. 11, 2022).

* cited by examiner

FILM ROLL OF HEAT-SHRINKABLE POLYESTER

TECHNICAL FIELD

The present invention relates to a film roll of heat-shrinkable polyester film obtained by winding heat-shrinkable polyester film. In particular, the present invention relates to heat-shrinkable polyester film having a longitudinal direction as the main shrinkage direction, and also relates to a film roll of the heat-shrinkable polyester film having less wrinkles around a winding core of the film roll and having less loss of film during printing or processing.

BACKGROUND ART

In recent years, drawn film, so called heat-shrinkable film, made of polyvinyl chloride resin, polystyrene resin, polyester resin or other resins has been widely used for cap sealing, integrated packaging, and label packaging of a glass bottle or a PET bottle to protect the bottles and display product information. Among the above-mentioned heat-shrinkable film, polyvinyl chloride film has problems such as low heat resistance, and hydrogen chloride gas and dioxin generation during incineration. Also, polystyrene film has problems such as poor solvent resistance causing the need for a special composition ink for printing and also has problems that the polystyrene film needs high-temperature incineration generating black smoke accompanying malodor. Considering these problems, polyester film has been selected widely for heat-shrinkable film such as a shrinkable label because polyester film has high heat resistance, easy incineration, and high solvent resistance. Therefore, the usage of the polyester film has been on the increase in accordance with the increase of trading volume of PET containers.

Heat-shrinkable polyester film shrinking significantly in a width direction of the film as a main shrinkage direction has been widely used.

Application of heat-shrinkable film as label film for a bottle or a banding label for bento requires forming the film into an annular shape, then covering the bottle or the box lunch container with the annular-shaped film, and heat-shrinking the annular-shaped film in the circumferential direction. Therefore, the heat-shrinkable polyester film having heat-shrinking direction in a width direction of the film needs to be form in an annular shape so that the width direction of the film becomes circumferential direction, then the annular-shaped film is cut at prescribed length and the cut annular-shaped film needs to be mounted to a bottle or a box lunch container by hand. Therefore, high-speed mounting of annular-shaped film to a bottle or a box lunch container cannot be attained by using a beverage label film or a band label made from the heat-shrinkable film having heat-shrinking direction in the width direction. To attain the high-speed mounting, there is a demand for film having heat shrinking direction in a longitudinal direction of the film capable of wrapping around a bottle or a box lunch container directly by film unwounded from a film roll. The heat shrinkable film having heat-shrinkage direction in the longitudinal direction attains high-speed mounting without processes such as center sealing process for sealing after forming film in an annular shape, or process of the cutting at prescribed length and the mounting by hand required by the film having heat-shrinking direction in the width direction.

Another aspect of using heat-shrinkable film, there is a demand for thinning film thickness to reduce waste because most of the film ends up disposed of. However, thinning film thickness hampers stiffness of the film and results in more difficulty to handle the film.

As a generally known film production process, a wide film master roll obtained from formed film is slitten at an arbitrary width and the slit film is wound to form a film roll at an arbitrary length to obtain a film roll as a product. Thus obtained film roll may be subjected to a printing process to provide a design printing or to display product description on the surface of the film. After the printing process, the film is slitten again at a necessary width and the slit film is wound as a roll.

The film with lowered handling property brings defects in a product film roll after slitting, or in film during winding up into a film roll after re-slitting or printing. Heat-shrinkable film has lowered stiffness compared to other kinds of widely used film resulting in poor handle of the film. According to the inventors of the present invention, the heat-shrinkable film having the thickness of, in particular, 30 µm or less is liable to cause such defects. Moreover, a production speed of film shows an increasing trend each year, slitting speed also shows an increasing trend. The increase of the slitting speed causes more defects for films having poor handling properties. Defects of the film cause troubles when a film roll is subjected to printing or other processes, or when the film is used as a label. Wrinkles formed in a winding core of a film roll causes troubles at the wrinkles position during printing or other processes, and this may lead to a large loss of film.

The heat-shrinkable film having the longitudinal direction as the main shrinkage direction is easily decreasing a dimension in the longitudinal direction with time, which is called natural shrinkage, and the degree of defects caused by natural shrinkage is larger in the film having the longitudinal direction as the main shrinkage direction than the film having the width direction as the main shrinkage direction. Therefore, at the time of storage or transports of the film having the longitudinal direction as the main shrinkage direction in a film roll state, tightening of the film roll or releasing of air may occur. In particular, wrinkles are generated around winding core, and this leads to a large loss of film. When the tightening of film is particularly large, a paper pipe, winding core of a film roll, may be deformed. In this case, the film roll is not able to be set to a shaft in the printing or working process, and the film roll itself may be lost.

PRIOR ART DOCUMENT

Patent Document

Patent Document 1: Japanese Laid-open Patent Publication No. 2003-266525
Patent Document 2: Japanese Patent Publication No. 3678220
Patent Document 3: Japanese Laid-open Patent Publication No. 2014-73688

Non-Patent Document

Non-Patent Document 1: A technical textbook of slitter rewinder, Converting Technical Institute, 1998

SUMMARY OF THE INVENTION

Problems to be Solved by the Invention

A number of technical literatures on slitting conditions to produce a film roll with less wrinkles have been published.

In Non-Patent Document 1, slitter conditions such as slitter tension and slitter control are described, however, no description about a paper pipe and physical properties of film is found in the document.

Patent Document 1 discloses that uniform winding hardness in the width direction of a film roll is desired as a slitting condition for obtaining a film roll with fewer wrinkles and slack. The purpose of this slitting conditions is to prevent wrinkles or slack of a film roll caused by air releasing. However, wrinkles caused by air releasing have a large impact on surface layer side of a film roll and a low impact on film core layer side closer to a paper pipe of the film roll. Therefore, the uniform winding hardness may generate wrinkles.

Patent Document 2 discloses the heat-shrinkable polyester film roll which has good thickness evenness with less fluctuation of heat shrinkability and solvent bonding strength over the whole length of the film in the form of the roll. However, this document does not disclose the wrinkles of a film roll.

Patent Document 3 discloses the heat-shrinkable polyester film roll which has excellent processability such as printing after long-term storage. However, the difference of winding hardness of a film roll of Patent Document 3 is larger than that of Patent Document 1. In addition, this document does not disclose the wrinkles generated around a winding core.

The present invention aims to solve the problems residing in the film roll obtained by winding above-described known thinner heat-shrinkable polyester film having a longitudinal direction as a main shrinkage direction and thereby providing a film roll of heat-shrinkable polyester film with less wrinkles around a winding core.

Solutions to the Problems

The present inventors have completed the present invention as a result of the studies in order to solve the above described problems. The present invention is comprised of the followings.

1. A film roll of heat-shrinkable polyester film obtained by winding around a paper pipe with the heat-shrinkable polyester film having a longitudinal direction as a main shrinkage direction, wherein the polyester film has a shrinkage of 40% or more in the main shrinkage direction after a treatment in hot water of 90° C. for 10 seconds, and the film roll satisfies the following requirements (1) to (7):
  (1) a winding length of the film is 1000 m or more and 30000 m or less;
  (2) a width of the film is 50 mm or more and 1500 mm or less;
  (3) a thickness of the film is 5 μm or more and 30 μm or less;
  (4) a thickness unevenness of the film is 20% or less over a whole width direction of the film on a surface of the film roll;
  (5) an internal diameter of the paper pipe is 3 inch, a gap difference of the paper pipe in a width direction of the paper role is 0.5 mm or less after a removal of the film from the film roll, and a flattering pressure strength of the paper pipe is 1700 N/100 mm or more after the removal of the film;
  (6) an average winding hardness of the film in a width direction of the film is 500 or more and 850 or less on the surface of the film roll;
  (7) a natural shrinkage of the film in a longitudinal direction of the film is 2.0% or less after aging the film in an atmosphere of 40° C. and 85% relative humidity for 28 days.

2. The film roll of the heat-shrinkable polyester film according to above 1, wherein the film roll further satisfies:
  a thickness unevenness over a whole width direction of the film is 20% or less for all film samples obtained at every 1000 m of the winding length from the surface of the film roll.

3. The film roll of the heat-shrinkable polyester film according to above 1 or 2, wherein the film roll further satisfies:
  a thickness unevenness in 30 m length in a longitudinal direction of the film is 20% or less.

4. The film roll of the heat-shrinkable polyester film according to any one of above 1 to 3, wherein the film roll further satisfies:
  a static friction coefficient and a dynamic friction coefficient between an outer winding surface and an inner winding surface of the heat-shrinkable polyester film is 0.1 or more and 0.8 or less.

5. The film roll of the heat-shrinkable polyester film according to any one of above 1 to 4, wherein the film roll further satisfies:
  a shrinkage stress in the main shrinkage direction of the heat-shrinkable polyester film is 4 MPa or more and 16 MPa or less.

Effects of the Invention

The film roll of heat-shrinkable polyester of the present invention has less wrinkles generated around a winding core. Therefore, the film roll exhibits good usability with less troubles during post processing such as printing.

MODE FOR CARRYING OUT THE INVENTION

[Heat-Shrinkable Polyester Film Composing Heat-Shrinkable Polyester Film Roll]

Polyester used for the heat-shrinkable polyester film composing the heat-shrinkable polyester film roll of the present invention contains ethylene terephthalate as a main constituent component. The main constituent component means that ethylene terephthalate is in an amount of 50 mol % or more, or preferably 60 mol % or more of ethylene terephthalate to 100 mol % of total constituent components of polyester. Examples of dicarboxylic acid components other than terephthalic acid constituting the polyester of the present invention include aromatic dicarboxylic acid such as isophthalic acid, naphthalenedicarboxylic acid, and orthophthalic acid; aliphatic dicarboxylic acid such as adipic acid, azelaic acid, sebacic acid, and decanedicarboxylic acid; and alicyclic dicarboxylic acid.

When aliphatic dicarboxylic acid such as adipic acid, sebacic acid, or decanedicarboxylic acid is contained, the content rate is preferably less than 3 mol %. Film stiffness of the heat-shrinkable polyester film obtained by containing 3 mol % or more of these aliphatic dicarboxylic acids becomes insufficient, and this insufficient stiffness causes defects during slitting or post processing.

Polycarboxylic acid having a valence of 3 or greater such as trimellitic acid, pyromellitic acid, and anhydride thereof are not preferably contained. For the heat-shrinkable polyester film obtained by using polycarboxylic acid mentioned above, desired high shrinkage is hard to be achieved.

Examples of diol components other than ethylene glycol composing polyester used for the present invention include aliphatic diols such as 1-3 propanediol, 1-4 butanediol, neopentyl glycol, and hexane diol; an alicyclic diol such as 1,4-cyclohexanedimethanol; and an aromatic diol such as bisphenol A.

As the polyester used for the heat-shrinkable polyester film of the present invention, polyester having adjusted its glass transition point, Tg, to 60 to 80° C. is preferably used by containing one or more kind of cyclic diol such as 1,4-cyclohexanedimethanol; C3-6 diols such as 1-3 propanediol, 1-4 butanediol, neopentyl glycol, and hexane diol.

In the polyester used for the heat-shrinkable polyester film of the present invention, the amount of one or more kinds of monomer component which can form an amorphous component is 14 mol % or more, more preferably 16 mol % or more, and particularly preferably 18 mol % or more in 100 mol % of a polyhydric alcohol component or in 100 mol % of a polycarboxylic acid in the whole polyester resin. Examples of the monomers which can form an amorphous component includes neopentyl glycol, 1,4-cyclohexanedimethanol, isophthalic acid, 1,4-cyclohexanedicarboxylic acid, 2,6-naphthalenedicarboxylic acid, 2,2-diethyl1,3-propanediol, 2-n-butyl-2-ethyl-1,3-propanediol, 2,2-isopropyl-1,3-propanediol, 2,2-di-n-butyl-1,3-propanediol, 1,4-butan diol, and hexanediol. Among them, neopentyl glycol, 1,4-cyclohexanedimethanol, or isophthalic acid is preferably used.

In the polyester used for the heat-shrinkable polyester film of the present invention, diols having 8 or more numbers of carbon such as octanediol, or polyhydric alcohols having the valence of 3 or greater such as trimethylolpropane, trimethylolethane, glycerine, and diglycerine are not preferably contained. When these diols or polyhydric alcohols are used, the obtained heat-shrinkable polyester film hardly achieves the necessary high shrinkage ratio.

To a resin forming the heat-shrinkable polyester film of the present invention, additives such as wax, antioxidant, antistatic agent, crystal-nucleation agent, viscosity reducing agent, heat stabilizer, pigment for coloring, color protection agent, and ultraviolet absorber may be added according to needs. Also to the resin forming the heat-shrinkable polyester film of the present invention, fine particles may preferably be added as a lubricant to improve the workability such as slipperiness of the polyethylene terephthalate resin film. Although any fine particles may be added, the following inorganic fine particles such as silica, alumina, titanium dioxide, calcium carbonate, kaolin, and barium sulfate can be mentioned as examples. The fine particles are also exemplified by the following organic particles such as acrylic resin particles, melamine resin particles, silicone resin particles, and crosslinked polystyrene particles. The average diameter of the particles is arbitrarily selected as needed within the range of 0.05 to 3.0 μm measured by a Coulter counter. The fine particles are added within the range of 300 to 1200 ppm, and the obtained film can have both good slipperiness (friction) and transparency.

The method by which the above-described particles are added to the resin forming the heat-shrinkable polyester film is, for example, adding the particles at any stages of the reaction in the production of polyester resin. The particles are added as a slurry dispersed in ethylene glycol preferably to promote polycondensation reaction at the stage of esterification or after the completion of transesterification reaction which is coming before the start of polycondensation reaction. Further, the above-described particles are added preferably by a method of blending a slurry of particles dispersed in ethylene glycol or water with polyester resin raw material using a kneading extruder having a vent, or a method of blending dried particles with polyester resin raw material using a kneading extruder.

Further, the heat-shrinkable polyester film of the present invention may be subjected to corona treatment, coating treatment, or flame treatment to have good surface adhesiveness.

The heat-shrinkable polyester film of the present invention includes a laminated type of multilayered polyester film, the laminated type of polyester film has at least one polyester resin layer. When two or more layers of polyester are laminated, the polyester resin layers may be made from the same composition of polyester, or may be made from different composition of polyester. Though the layer which may be laminated as other layer is not particularly restricted, polystyrene resin layer is preferably used in terms of the cost and heat shrinkability.

The heat shrinkage in hot water of 90° C., that is, the heat shrinkage in the longitudinal direction of the heat-shrinkable polyester film of the present invention is required to be 40% or more when the film is treated in hot water of 90° C. for 10 seconds with no load. Heat shrinkage is calculated according to the following formula 1.

$$\text{heat shrinkage} = \{(\text{length before shrinkage} - \text{length after shrinkage})/\text{length before shrinkage}\} \times 100 \, (\%) \quad \text{Formula 1:}$$

With the hot-water heat shrinkage at 90° C. in the longitudinal direction smaller than 40%, shrinkage of the film becomes too small, and the label after heat shrinkage has wrinkles and insufficient shrinkage and therefore, the film is not preferable as heat-shrinkable film.

The thickness of the heat-shrinkable polyester film of the present invention is preferably 5 μm or more and 30 μm or less. In the present invention, film thickness was confirmed up to 5 μm, so the film thickness mentioned above is defined to be 5 μm or larger. The thicker film preferably has stiffness and less wrinkles generated around a winding core, however, the thick film goes against the environment friendly thinner film. The upper limit of the film thickness of the present invention is 30 μm. As described above, the present invention solves the defects of wrinkles which is easily generated around a winding core and seen in the case of the heat-shrinkable polyester film having a thickness of 30 μm or less.

The natural shrinkage of the heat-shrinkable polyester film of the present invention is preferably 2.0% or less in the longitudinal direction after the film is aged in an atmosphere of 40° C. and 85% relative humidity for 28 days (672 hours). In general, heat-shrinkable film roll is stored in an atmosphere of low temperature and ideally transported by the methods in which low temperature is kept during transportation by truck or ship. However, it's not realistic for all the film rolls to be treated in such a way physically or financially, so film rolls are often placed under the environment of 40° C. or higher in some cases due to seasonal reasons. When the natural shrinkage is larger than 2.0%, film naturally shrinks in the longitudinal direction, in the direction winding tightening becomes worse, at the time of storage or transports, and wrinkles around a winding core or distortion of a paper pipe may be undesirably generated. Natural shrinkage is more preferably 1.5% or less, further preferably 1.0%. Natural shrinkage is ideally, the lower limit of is 0.0%.

Maximum shrinkage stress in the main shrinkage direction of the heat-shrinkable polyester film of the present invention is preferably 2 MPa or more and 16 MPa or less when measured under hot air of 90° C. Measurement of shrinkage stress is carried out in the method described in Examples.

When the maximum shrinkage stress at 90° C. in the longitudinal direction is larger than 16 MPa, a paper pipe may be easily distorted by winding tightening generated by natural shrinkage, and this may lead to undesirable generation of wrinkles around a winding core. To make matters worse, the paper pipe may be crushed by the stress of the film. In this case, it becomes impossible for the film roll to be processed, and the film roll itself is lost from the production line. Maximum shrinkage at 90° C. is preferably 16 MPa or less, and more preferably 14 MPa or less. When the maximum shrinkage stress at 90° C. is lower than 2 MPa, undesirably, labels of the film become loosen and are not tightly mounted to containers. Maximum shrinkage at 90° C. is more preferably 3 MPa or more, and further preferably 4 MPa or more.

Both of the static friction coefficient and the dynamic friction coefficient between an outer winding surface and an inner winding surface of the heat-shrinkable polyester film of the present invention are preferably 0.1 or more and 0.8 or less. When the friction coefficients are smaller than 0.1, film becomes too slippery, and shift of end surface may occur. When the friction coefficients are larger than 0.8, the amount of air sucked is increased at the time of slitting, and the film becomes easily loosen or wrinkled due to air releasing from a film roll. The friction coefficients are preferably 0.13 or more and 0.77 or less, and further preferably 0.16 or more and 0.74 or less.

[Characteristics of Heat-Shrinkable Polyester Film Roll]

The length of the heat-shrinkable polyester film roll of the present invention, that is, the length of the film of heat-shrinkable multilayered polyester film roll is preferably 1000 m or more and 30000 m or less. The film which has a long winding length can decrease the frequency of film roll exchange, and working efficiency is improved at the process such as printing. The length is preferably 2000 m or more, and further preferably 3000 m or more. The upper limit of the length is not particularly restricted, and the film of long winding length is preferable. The inventors confirmed film winding length up to 30000 m and therefore, the upper limit of the winding length is taken as 30000 m.

The width of the heat-shrinkable polyester film roll of the present invention is preferably 50 mm or more and 1500 mm or less. There is no upper width limit, and film loss during printing process can be preferably decreased with the film broad in width. The inventors confirmed the film widths up to 1500 mm, therefore the upper limit is taken as 1500 mm. The film broad in width is preferable, since the efficiency of the process such as printing is improved with broader film width as described above. The film width is preferably 100 mm or more, and further preferably 300 mm or more.

The thickness unevenness in width direction of the surface layer of the heat-shrinkable polyester film of the present invention is 20% or less when calculated according to the following formula 2. When the thickness unevenness in the width direction is worse, undesirably, wrinkles are easily generated at the time of slitting. The thickness unevenness is preferably 18% or less, and further preferably 15% or less. The smaller the thickness unevenness value is, the more preferable it is.

"Surface layer of film roll" or "surface part of film roll" of the present invention means the rest of the film roll after the removal of 1 m of film from the surface layer of the film roll.

$$\{(\text{maximum thickness})-(\text{minimum thickness})-\text{average thickness}\}\times 100(\%) \quad \text{Formula 2:}$$

Thickness unevenness in the longitudinal direction of the heat-shrinkable polyester film of the present invention is 20% or less when calculated according to the formula 2. When the thickness unevenness in the longitudinal direction is bad, undesirably, tension at the time of slitting becomes unstable, and wrinkles are easily generated. The thickness unevenness is preferably 18% or less, and further preferably 15% or less. The smaller the thickness unevenness is, the more preferable it is.

In the heat-shrinkable polyester film roll of the present invention, the gap difference of a paper pipe in the width direction is preferably 0.5 mm or less after the film is removed from a film roll. While the film is being stored as film rolls wound around paper pipes, distortion of film or distortion of the paper pipes due to natural shrinkage are generated. When the distortion difference of the paper pipe in the width direction, gap difference in the width direction, is large, undesirably, wrinkles are generated at winding core side of the film roll. Therefore, gap difference of the paper pipe after the removal of the film from the film roll is preferably 0.4 mm or less, and further preferably 0.3 mm or less. The gap difference of the paper pipe in the width direction can be measured by the method described in Examples.

A core to wind film around is exemplified by a paper pipe, a plastic core, and a metal core. In the present invention, a paper pipe having an internal diameter of 3 inch is used, since this kind of core is cheap and versatile. Thickness of the paper pipe is preferably 7 to 30 mm.

In the heat-shrinkable polyester film roll of the present invention, the flattering pressure strength of the paper pipe having 3 inch of core diameter is preferably 1700 N/100 mm after the removal of the film from the film roll. With the pressure resistance lower than 1700 N/100 mm, the paper pipe is distorted due to the internal stress applied to after the film is wound and natural shrinkage in storage, and undesirably, wrinkles are generated around a winding core of the film roll. The flattering pressure strength of the paper pipe is preferably 1800 N/100 mm or more and more preferably 1900 N/100 mm or more. The higher the pressure resistance is, the more preferable it is. A method for obtaining a paper roll with high flattering pressure strength includes increasing thickness of the paper pipe, or using a hard paper pipe or a super hard paper pipe designed to have high strength.

The gap difference of a paper pipe used to wind film around is preferably 0.3 mm or less before winding to make the gap difference of the paper pipe after the removal of the film from the film roll 0.5 mm or less in the heat-shrinkable polyester film of the present invention. The gap difference is more preferably 0.2 mm or less, and further preferably 0.1 mm or less. The method to reduce gap difference of a paper pipe is as follows. The gap difference of a paper pipe is reduced by using a paper pipe which is hard and not easily deformed by vibration during transports. The gap may be decreased by keeping a paper pipe in a moisture proof bag until the use of the paper pipe to prevent deformation caused by moisture absorption. Or the paper pipe may be kept in a room where the temperature and humidity are maintained constant to prevent deformation caused by moisture absorption.

The average value of the winding hardness in the width direction of the surface layer of the heat-shrinkable polyester film roll of the present invention is preferably 500 or more and 850 or less. When the winding hardness is less than 500, the degree of winding becomes soft and wrinkles around winding core are improved but shift of end surface of the film roll is generated. When the winding hardness is higher than 850, the degree of winding becomes hard, and wrinkles are generated due to thickness unevenness. The average of the winding hardness in the width direction of the surface layer of the film roll is preferably 500 or more and 800 or less, further preferably 600 or more and 750 or less, and even more preferably larger than 650 and 750 or less. Winding hardness is measured by the method described in Examples detailed later in the present invention. The preferable method to wind film having the winding hardness ranged above is also described later.

In the present invention of the heat-shrinkable polyester film roll, one of the problems to be solved is to reduce wrinkles around winding core. Wrinkles are generated around the winding core when the film roll is slitten, or during storage or transports by trucks. The wrinkles may be over hundreds of meters in length from a winding core, and this long wrinkles may be a huge loss during processes such as printing of film roll. Wrinkles are not preferably generated over the winding length of 30 m or more from the paper pipe of the heat-shrinkable polyester film of the present invention. When wrinkles are generated at the positions longer than 30 m from the paper pipe, the wrinkles are included in products such as printed products, and this becomes loss of the products. The winding length in which film may have wrinkles from a paper pipe is preferably 0 m, this means there exists no wrinkles. However, the film of 30 m in winding length from a paper pipe is not usually used due to pass line of a printing machine, and the winding length which may have wrinkles is taken as 30 m.

[Production Method for Heat-Shrinkable Polyester Film Roll]

Hereinafter, preferable production method for the heat-shrinkable polyester film roll of the present invention will be described in detail.

Above-described polyester raw material is molten extruded from an extruder to form undrawn film. The undrawn film is drawn and heat treated by the prescribed method shown below, and the heat-shrinkable polyester film of the present invention is obtained. Extruders, feed blocks, and multi-manifolds are available to laminate film. To obtain polyester, above-described dicarboxylic acid component and diol component are preferably used for polycondensation by know method. Two or more kinds of chip-shaped polyester resin are mixed and used as raw materials of film.

When two or more kinds of raw materials are introduce to an extruder, irregularity, so called monotectoid of raw materials, is generated in feeding raw materials, and this causes irregularity of film composition bringing thickness unevenness in the width direction. To prevent this phenomenon to occur, raw materials are molten extruded after uniformly mixed by an agitator set in a pipe line or in a hopper directly placed on an extruder, and the thickness unevenness becomes within the prescribed range.

As a specific production method for the film and the label, chip shaped raw material is dried using dryers such as hopper dryer, paddle dryer, or vacuum dryer, and the raw material is mixed uniformly using an agitator in a hopper placed on an extruder. The mixed raw material is extruded as film at 200 to 280° C. Or undried but uniformly mixed polyester raw material like above is extruded from a vent type extruder in a film shape with water being removed in the extruder. T-die method, tubular method, or other existing methods can be employed for the extrusion. Among them, T-die method is preferable to improve thickness unevenness.

The temperature for the extrusion is not allowed to be higher than 280° C. When the melting temperature is too high, undesirably, intrinsic viscosity when used as labels is lowered, and cracks are generated.

Shear rate at the exit of T-die is calculated according to the following formula 3.

Shear rate $$\gamma = 6Q/(W \times H^2)$$ Formula 3:

γ; shear rate (sec$^{-1}$)
Q; discharge amount of raw material from extruder (cm$^3$/sec)
W; width of opening part of T-die exit (cm)
H; Lip gap of T-die (cm)

High shear rate is preferable, for the thickness unevenness of the film both in the longitudinal and the width direction is decreased. Particularly, thickness unevenness measured in the longitudinal direction using the film of 30 m in length can be decreased, for the pressure when resin is discharged from the exit of T-die becomes stable with the high shear rate. The shear rate is preferably 200 sec$^{-1}$ or more, further preferably 250 sec$^{-1}$ or more, and particularly preferably 270 sec$^{-1}$ or more. Thickness unevenness is improved when draft ratio is high, however, resin crud may be found at resin discharging part of T-die due to high draft ratio, and productivity becomes poor. Therefore, the draft ratio should not be preferably too high.

After the extrusion, undrawn film is obtained by quenching. This "undrawn film" includes the film to which the tension required for film feeding is applied. The method to quench molten resin is, as preferably employed, casting molten resin on a rotating drum to be quenched and solidified, and the resin sheet substantially unoriented is obtained.

Moreover, the heat-shrinkable polyester film of the present invention is obtained by longitudinally drawing the obtained undrawn film under the prescribed conditions described below.

Normally, the heat-shrinkable polyester film is produced by drawing undrawn film in the direction desired to be shrunk. In the present invention, undrawn film is uniaxially drawn in the longitudinal direction, the main shrinkage direction. Or the undrawn film is biaxially drawn, that is, the film is drawn in the longitudinal direction, after the drawing in the width direction. When the undrawn film is uniaxially drawn in the longitudinal direction, the undrawn film is introduced to a vertical drawing machine having rolls continuously arrange in it, and the film is heated to the prescribed temperature on a preheating roll (low-speed roll) first. Then high-speed roll which rotates at a higher speed than the low-speed roll is set downstream of the preheating roll, and the film is longitudinally, vertically, drawn, using the speed gap between the low-speed roll and the high-speed roll.

Though the drawing ratio during the drawing process mentioned above is not particularly restricted, the ratio is preferably 2 times or more and 6 times or less. When the drawing ratio is less than 2 times, undesirably, high shrinkage in terms of material balance and thickness unevenness in the longitudinal direction becomes worse. When the drawing ratio is larger than 6 times, drawing stress becomes too high, and shrinkage stress of the obtained film becomes high, too. This increase in shrinkage stress leads to the deformation or crushing of a paper pipe due to tight winding of a film roll. Drawing ratio is more preferably 3.5 times or more and 5.5 times or less, further preferably 4.0 time or more and 5.0 times or less.

The film temperature at the time of longitudinal drawing is preferably Tg+5° C. or higher and 40° C. or lower. When the film temperature is lower than Tg+5° C., undesirably, rupture of film may be easily generated. When the temperature is higher than Tg+40° C., thermo crystallization of film progresses, and undesirably, shrinkage becomes decreased. More preferably, the temperature is Tg+8° C. or higher and Tg+37° C. or lower, further preferably Tg+11° C. or higher and Tg+34° C. or lower.

The gap between the low-speed roll and the high-speed roll at the time of longitudinal drawing is preferably narrow. Specifically, the drawing distance between the low-speed roll and the high-speed roll is preferably 30 mm or longer or 300 mm or shorter. Longer than 300 mm of the drawing distance of the longitudinal drawing easily causes necking because of the long drawing distance. Necking is the phenomenon of decreased film width caused by the stress in the width direction accompanied by Poisson's force of drawing stress at the time of longitudinal drawing. Necking occurs at around the end of film, that is, film shrinks in the width direction at around the end of film, and therefore, film thickness increases at around the end of film compared to central part of film. Thickness unevenness of film becomes worse due to necking in the width direction, therefore, wrinkles around winding core are easily generated when film is wound as a film roll. Necking is preferably required to be as small as possible. The upper limit of the drawing distance is preferably 250 mm or less, and further preferably 200 mm or less. As a method for decreasing the drawing distance, the film is passed on the low-speed roll and the high-speed roll in a crossed state by obliquely placing the low-speed roll and the high-speed roll placed just before drawing. The lower limit of the drawing distance is considered to be 30 mm or so, therefore, the lower limit is taken as 30 mm.

Normally, film production after drawing includes the process of continuous cutting off of end parts of the film drawn for film production. This process aims to remove the thick parts of the film caused by necking during casting of resin raw material or to remove laterally undrawn parts of the film. By cutting off the thick parts of the film caused by necking during longitudinal drawing process, thickness unevenness in the width direction of a film roll can be decreased. However, this cutting process of the film decreases the effective width of the film and results in a production cost increase. Removing the end parts continuously in a wide range of film is not preferable, therefore, necking is required to be as small as possible as described above.

Before the longitudinal drawing process, film may be laterally drawn by a tenter. By laterally drawing of film, it becomes easier to obtain the film having uniform thickness in the width direction in a wide width range of film. In addition, biaxially drawing increases entanglement of polymer chain, and natural shrinkage decreases as the effect. However, the introduction of laterally drawing machine makes the whole film production machine huge, and production cost increases. When film is drawn laterally, film is heated to the film temperature of Tg+5° C. or higher and Tg+40° C. or lower, and drawing ratio is preferably 3.0 times or more and 6.0 times or less.

After the longitudinal drawing describe above, film is introduced to a tenter in which film is grasped by both ends with clips and heated, and film is subjected to heat treatment. The heat treatment relaxes the residual stress occurred when film is longitudinally drawing, and naturel shrinkage and shrinkage stress in the longitudinal direction are decreased. The temperature of the heat treatment is preferably Tg of film or higher and Tg+40° C. or lower. With the heating temperature lower than Tg, the effects mentioned above is not obtained. Undesirably, shrinkage significantly decreases when the temperature is higher than Tg+40° C.

Thus obtained heat-shrinkable polyester film is wound as a film roll of a wide width, an intermediate product in other words. Then the film roll is slit to prescribed width and winding length, and wound around a paper pipe of 3 inch. In this way, the heat-shrinkable polyester film roll is obtained. Preferable range of winding length and width of the film roll is described above.

Further, wrinkles of film generated around winding core at the time of slitting can be preferably reduced by employing the following slitting conditions. When the heat-shrinkable polyester film having the longitudinal direction as the main shrinkage direction is wound as a film roll, defects often occur especially for the film which is 30 μm or less in thickness. However, by employing above-described slitting conditions, wrinkles around winding core of the film decreases and shift of end surface of film is prevented as described below. In addition, average value of the winding hardness of the surface layer of the film roll can be set within a preferable range by employing the slitting conditions.

Specific conditions of slitting are as follows. Slitting is started with an initial tension of 70 to 140 N/m, preferably 80 to 130 N/m, and with an initial surface pressure of 200 to 400 N/m, preferably 250 to 350 N/m. When the initial tension is more than 140 N/m, parts of film having thickness unevenness is slightly extended by the tension of slitting, and this causes wrinkles, wrinkles around a winding core, or slack. Further, when the initial tension is more than 140 N/m, the effect of slight curve or distortion of a paper pipe become large, and wrinkles around winding core are caused. When the initial tension is 70 N/m or smaller, tension becomes insufficient when film is wound by slit, and wrinkles around winding core become hard to be generated. However, irregularity of end surface, so called shift of end surface, of film may be undesirably generated. Tension is decreased at a fixed ratio in correlation with winding length so that and the tension of the film at the position 800 m before the end of slitting becomes 50 to 80% of an initial tension, preferably 60 to 70%. After that, film is wound at a fixed tension till the end of the film. The surface pressure is preferably ±5% or less of an initial surface pressure over the whole length of film, further preferably ±3% or less.

Winding hardness of the surface layer of the slitten film roll as described above is preferably 500 or more and 850 or less. Preferable range of the average value of the winding hardness of the surface layer of the film roll in the width direction is described above.

The shift of end surface of the film roll of the present invention is measured by the method described in the following Examples. Preferably, the shift of end surface of a film roll is 2 mm or less. When the shift of end surface is large, pitch deviation is easily occurred when printed in multicolor, and products such as label may impair design performance and commodity value.

Generally, in the industrial production of a film roll, successively produced film is continuously wound, and the extent of thickness unevenness of film is almost the same over the whole winding length when the film production condition is unchanged. However, slight changes in thickness unevenness occur due to delicate change of processes at the time of film making. Thickness unevenness of film in the longitudinal direction is preferably controlled over whole winding length. For example, samples of film are collected at prescribe intervals of winding length from the surface layer of film roll, and thickness unevenness is measured to confirm if it is controlled over the whole length of winding length. In the film roll of the present invention, thickness unevenness is measured by taking a sample of the surface layer of the film, and a measured value can be taken as a representative of the thickness unevenness of the film roll. As described in the following Examples in the present invention, 1 m of the film is removed from the surface layer of the film roll, and from the point of removal, samples are collected to determine the representative value. Preferable range of the thickness unevenness in the width direction of film at the surface layer is described above.

In the present invention, preferably, thickness unevenness of the film samples measured is within the prescribed range when the samples are prepared from a film roll at every 1000 m of winding length from the surface layer. Preferable range of the thickness unevenness of the film in the width direction over the whole film width and the whole film roll winding length is described above.

EXAMPLES

The present invention is hereinafter described specifically with the reference to Examples and Comparative Examples, however, the present invention is not restricted by the Examples, carried out with appropriate modifications made to the extent adaptable to the gist of the present invention.

Evaluation methods used in the present invention are as follows. Unless otherwise stated, film of 1 m in length was removed from the surface layer of a film roll, and evaluation was made using the surface layer of the remaining film or film roll after the removal.

[Heat Shrinkage in Main Shrinkage Direction]

Film was cut into a square of 10 cm×10 cm in size and heat shrunk by treating in hot water having the temperature of 90° C.±0.5° C. with no load for 10 seconds. Then film dimension in the longitudinal direction, the main shrinkage direction, was measured, and heat shrinkage was calculated according to the following formula (1).

heat shrinkage={(length before shrinkage−length after shrinkage)/length before shrinkage}×100 (%)     Formula 1:

[Thickness Unevenness Over Whole Width in Width Direction]

A film roll was set to a slitter, and 1 m of film was removed from the surface layer of the film roll. Then, a test piece was prepared by sampling the film sized 40 mm in the longitudinal direction and whole width in the width direction from the film roll. Thickness in the width direction was continuously measured at a rate of 5 m/min using a continuous contact thickness measuring instrument manufactured by Mikuron Keisokuki Co., Ltd. Thickness unevenness in the width direction was calculated according to the following formula (2). $T_{max}$, $T_{min}$, and $T_{ave}$ respectively represent maximum thickness, minimum thickness, and average thickness.

thickness unevenness={$(T_{max.}-T_{min})/T_{ave.}$}×100(%)     Formula 2:

[Thickness Unevenness in Longitudinal Direction]

A test piece sized 30 m in length and 40 mm in width in the longitudinal direction of film was sampled. Then thickness unevenness was measured at a rate of 5 m/min using a continuous contact thickness measuring instrument manufactured by Mikuron Keisokuki Co., Ltd. According to the formula (2), thickness unevenness in the longitudinal direction of the film was calculated similarly to the case of thickness unevenness in the width direction.

[Evaluation of Wrinkles of Film Around Winding Core]

Film was rewound from a film roll until the winding length positioned 300 mm in displayed length. Then the rest of the film was slitten to the position of a paper pipe at a slitting rate of 30 m/min, and wrinkles were visually checked. Evaluation was made by checking the existence of wrinkles at the position of 30 m to 300 m in winding length from the paper pipe.

Without wrinkle: ○

With wrinkle, at least one: x

[Gap Difference of Paper Pipe in Width Direction Before Film is Wound Around]

A paper pipe was placed on a horizontal table, and gap differences of the following 5 points of the paper pipe were measured. The positions are; positions 10 mm from both ends in a width direction, a center, and middle points between the center and the positions 10 mm from the both ends. Gap difference at each position was measured using a thickness gauge while the paper pipe was traveled a round on the horizontal desk. The maximum gap of the paper pipe rotated was determined as the gap at the position. The gaps at the five positions (three points at the center of the paper pipe, two points between the center and both ends, totally 5 points) of the paper pipe in the width direction were measured. Distortion of the paper pipe was defined by the difference of the maximum gap and the minimum gap.

[Gap Difference after Film Removal]

Film was rewound and removed from a film roll. The remaining paper pipe after the film removal was used to measure a gap by the method described above.

[Flattering Pressure Strength of Paper Pipe]

The paper pipe after film removal and described above was cut to the length of 100 mm in the width direction. The cut pieces of the paper pipe were compressed at a rate of 20 mm/min using a pressure test machine AGS-G manufactured by Shimadzu Corporation.

[Winding Hardness]

Using a hardness testing machine Parotester 2 manufactured by Proceq of Swiss, measurement was carried out at a length interval of 100 mm starting from one end of film in the width direction. The average of the measurement value in the width direction of the film roll was taken as a measurement value.

[Natural Shrinkage]

Film was cut to the size of 200 mm×30 mm=longitudinal direction×orthogonal direction to obtain a test piece, and an indicative line of 150 mm in length was drawn in the longitudinal direction on the sample film. After the test piece was placed in an atmosphere of 40° C. and 85% relative humidity for 28 days (672 hours) for aging, the length of the indicative line was measured. Natural shrinkage was calculated according to the following formula (4).

natural shrinkage={length of indicative line before shrinkage (150 mm)−length of indicative line after shrinkage}÷{length of indicative line before shrinkage (150 mm)}×100(%)     Formula 4:

[Coefficient of Friction]

In accordance with JIS K 7125, the static friction coefficient and the dynamic friction coefficient when a front surface and a back surface of film were contacted were measured using a tensile testing machine in an environment of 23° C. and 65% relative humidity. The thread (anchor) wound around with upper part of the film weighed 1.5 kg, and the bottom area of the thread was the size of 63 mm in length and 63 mm in width. Tension rate for the friction coefficient measurement was 200 mm/min.

[Shrinkage Stress]

A strip shape of sample sized in 150 mm in length in the longitudinal direction and 20 mm in width was cut out from heat-shrinkable film. Using the test piece, shrinkage stress was measured with TENSILON PTM-250 (TENSILON is a registered trademark of ORIENTEC CORPORATION), a strength and elongation measuring machine equipped with a heating furnace and manufactured by Toyo Baldwin Co. Ltd. known as a current company name of ORIENTEC CORPORATION. Inside of the heating furnace of the strength and elongation measuring machine was preheated to 90° C., and a distance between chucks to grasp film samples with was set to 100 mm. The air blast blown into the heating furnace was stopped to open the door of the heating furnace, and the film sample was set using the chucks. The film sample 150 mm in length was grasped by the chucks by 25 mm at both ends, the distance between the chucks was set to 100 mm, and the sample was fixed without slack so that the direction in which the chucks were connected corresponded to the longitudinal direction of the film and that the sample became horizontal. After the sample was set to the chucks, the door of the heating furnace was closed promptly, and air blast was resumed. The starting time of shrinkage stress measurement defined as the time of the door's closure to resume air blast, and shrinkage stress (MPa) was determined as the maximum value of measurement value of shrinkage stress during the measurement of 30 seconds from the starting point.

[Shift of End Surface of Film Roll]

Using a die-type rule, end surfaces of a film roll were measured. The shift of end surface was calculated from the maximum value and the minimum value of irregularity of the end surfaces. Irregularity was judged according to the following evaluation method.

2 mm or less: ○
More than 2 mm: x

[Preparation of Polyester Raw Material]

Synthetic Example 1

In a stainless steel autoclave equipped with a stirrer, a thermometer and a partially circulating cooler, 100 mol % of dimethyl terephthalate (DMT) as a dicarboxylic acid component and 100 mol % of ethylene glycol (EG) as a polyhydric alcohol component were prepared so that the amount of ethylene glycol became 2.2 times that of dimethyl terephthalate in a molar ratio. Then 0.05 mol % of zinc acetate (based on the acid component) as an ester exchange catalyst and 0.225 mol % of antimony trioxide (based on the acid component) as polycondensation catalyst were added, and ester exchange reaction was carried out while distilling away the generated methanol from the system. Thereafter, a polycondensation reaction was carried out at 280° C. under reduced pressure of 26.7 Pa to obtain polyester 1 of 0.75 dl/g of intrinsic viscosity. The composition of polyester 1 is shown in Table 1.

Synthetic Examples 2 to 5

Polyesters 2 to 4 shown in Table 1 were obtained in the same manner as described in Synthetic Example 1. In the production of polyester 2, SiO$_2$ (Silysia 266, FUJI SILYSIA CHEMICAL LTD.) of an average particle diameter of 1.5 μm was added as a lubricant to polyester at a rate of 7200 ppm. In Table 1, NPG represents neopenthyl glycol, and BD represents 1,4-butanedinol. Intrinsic viscosity of each polyester was 2: 0.75 dl/g, 3: 0.75 dl/g, 4: 1.20 dl/g. The polyesters were appropriately formed into chips. The composition of each polyester is shown in Table 1.

TABLE 1

| | Polyester raw material composition (mol %) | | | | Addition amount of lubricant (ppm) |
|---|---|---|---|---|---|
| | Dicarboxylic acid component | Glycol components | | | |
| | TPA | EG | NPG | BD | |
| Polyester 1 | 100 | 100 | 0 | 0 | 0 |
| Polyester 2 | 100 | 100 | 0 | 0 | 7200 |
| Polyester 3 | 100 | 60 | 30 | 0 | 0 |
| Polyester 4 | 100 | 0 | 0 | 100 | 0 |

TPA: terephthalic acid
EG: ethylene glycol
NPG: neopenthyl glycol
BD: butanediol

[Method for Producing Heat-Shrinkable Film]

Example 1

Above-described polyester 1, polyester 2, polyester 3, and polyester 4 were separately dried, mixed in the mass ratio of 23:7:6:10, and then introduced to an extruder. The raw material was introduced to an extruder with the four kinds of polyester raw material being stirred using a stirring apparatus placed on the extruder. This mixed resin was molten at 260° C., and extruded from a T-die at a shear rate of 440 sec$^{-1}$ and a velocity of 50 m/min. The extruded mixed resin was contacted to a rotating metal roll cooled to a surface temperature of 25° C. for quenching, and undrawn film of 68 μm in thickness was obtained. Tg of the undrawn film was 69° C.

The undrawn film was introduced to a vertical stretching machine. After the film was heated on a preheating roll until the film temperature became 90° C. (Tg+21° C.), the film was vertically drawn by a roll stretching method so that the drawing ratio in the longitudinal direction became 4.5 times and film thickness became 15 μm after elongation. After the vertical drawing, the film was cooled on a cooling roll set to a surface temperature of 25° C. The drawing distance was 150 mm. Then the film after drawing was introduced to a tenter, and the film was heat treated by heating till the film temperature became 80° C. while the width of the film was kept fixed by grasping both ends of the film with clips. The film was then cooled and cut by 50 mm from both ends of the film, and wound in a roll shape of 1200 mm in width. In this way, drawn film of 15 μm in thickness was continuously produced in a prescribed length.

The drawn film obtained above was slitten using a slitter to the width of 1100 mm and the winding length of 12000 m.

Conditions for slitting are as follows. Slitting was started with an initial tension of 110 N/m and an initial surface pressure of 350 N/m. Tensile was decreased at a rate of 0.374 N/m from the winding length of 500 to 11200 m and kept at 70 N/m (64% of the initial tension) from 11200 m to 12000. The film was slitten so that the surface pressure became constant at 350 N/m.

Properties of thus obtained film roll and film were evaluated by the methods described above.

Manufacturing conditions of the film and the film roll are shown in Table 2, and the evaluation results are shown in Table 3. The results were good, for the film having aimed characteristics was obtained and wrinkles around winding core and shift of end surface were not observed.

Example 2

Above-described polyester 1, polyester 2, polyester 3, and polyester 4 were separately dried, and introduced to an extruder in the mass ratio of 3:7:66:24. Temperature of longitudinal drawing was 85° C. Except for the changes in the mass ratio and the temperature, a film roll was obtained by the same method described as Example 1. Tg of the obtained undrawn film was 62° C. Manufacturing conditions of the film and the film roll are shown in Table 2, and the evaluation results are shown in Table 3. The results were good, for the film having aimed characteristics was obtained and wrinkles around winding core and shift of end surface were not observed.

Example 3

Above-described polyester 1, polyester 2, polyester 3, and polyester 4 were separately dried, and introduced to an extruder in the mass ratio of 20:7:53:20. Temperature of longitudinal drawing was 87° C. Except for the changes in the mass ratio and the temperature, film roll was obtained by the same method as described Example 1. Tg of the obtained undrawn film was 63° C. Manufacturing conditions of the film and the film roll are shown in Table 2, and the evaluation results are shown in Table 3. The results were good, for the film having aimed characteristics was obtained and wrinkles around winding core and shift of end surface were not observed.

Example 4

A film roll was obtained by the same method as described in Example 1 except that molten substance of mixed resin was extruded from a T-die at a shearing rate of 290 sec$^{-1}$. Manufacturing conditions of the film and the film roll are shown in Table 2, and the evaluation results are shown in Table 3. The results were good, for the film having aimed characteristics was obtained and wrinkles around winding core and shift of end surface were not observed.

Example 5

Film roll was obtained by the same method as described in Example 1 except that the drawing gap at the time of longitudinal drawing was changed to 250 mm. Manufacturing conditions of the film and the film roll are shown in Table 2, and the evaluation results are shown in Table 3. The results were good, for the film having aimed characteristics was obtained and wrinkles around winding core and shift of end surface were not observed.

Example 6

The undrawn film of 150 μm in thickness was obtained by the same method as described in above Examples and was introduce to a tenter (a lateral stretching machine). With both ends of the film being grasped by clips, the film was preheated till the film temperature became 92° C. (Tg+23° C.), and the film was drawn 4.0 times in the transverse direction. After the transverse drawing, the film was introduce to a longitudinal drawing machine, and heated on a preheating roll until the film temperature became 90° C. (Tg+21° C.) Then the film was longitudinally drawn so that drawing ratio in the longitudinal direction became 2.5 times and film thickness became 15 μm. Similarly to Example 1, the film was introduce to the tenter again and heat treated at 80° C.

Thus obtained stretched film was slitten to the size of 2200 mm, 1100 mm, or 200 mm in width, and 12000 m in winding length. Slitting conditions were the same as Example 1.

Properties of thus obtained film roll and film were evaluated by the methods described above.

Manufacturing conditions of the film and the film roll are shown in Table 2, and the evaluation results are shown in Table 3. The results were good, for the film having aimed characteristics was obtained and wrinkles around winding core and shift of end surface were not observed.

Example 7

Film was produced by the same method as described in Example 1 except that the discharge rate was regulated so that the film thickness after drawing became 25 μm. Properties of thus obtained film roll and film were evaluated by the methods described above.

Manufacturing conditions of the film and the film roll are shown in Table 2, and the evaluation results are shown in Table 3. The results were good, for the film having aimed characteristics was obtained and wrinkles around winding core and shift of end surface were not observed.

Example 8

Film was produced by the same method as described in Example 1 except that the winding length of film roll was 24000 m. Properties of thus obtained film roll and film were evaluated by the methods described above.

Manufacturing conditions of the film and the film roll are shown in Table 2, and the evaluation results are shown in Table 3. The results were good, for the film having aimed characteristics was obtained and wrinkles around winding core and shift of end surface were not observed.

Comparative Example 1

Film and a film roll were obtained by the same method as described in Example 1 except that the flattering pressure strength of a paper pipe before slitting was 1490 N/100 mm. Manufacturing conditions of the film and the film roll are shown in Table 2, and the evaluation results are shown in Table 3. For the obtained film and the film roll, gap difference of the paper pipe in the width direction after the film removal was large, the evaluation result was bad in that wrinkles around a winding core of the film roll and shift of end surface were generated.

Comparative Example 2

A film roll was obtained by the same method as Example except that gap difference of a paper pipe in the longitudinal direction before slitting was large.

Manufacturing conditions of the film and the film roll are shown in Table 2, and the evaluation results are shown in Table 3. For the obtained film and the film roll, gap difference of the paper pipe in the width direction after the film removal was large, and the evaluation result was bad in that wrinkles around a winding core of the film roll and shift of end surface were generated.

Comparative Example 3

Film and a film roll were obtained by the same method as described in Example 1 except that film was not subjected to the heat treatment after longitudinal drawing.

Manufacturing conditions of the film and the film roll are shown in Table 2, and the evaluation results are shown in Table 3. Thus obtained film had high natural shrinkage and shrinkage stress. For the obtained film and the film roll, gap difference of the paper pipe in the width direction after the film removal was large, and the evaluation result was bad in that wrinkles around a winding core of the film roll and shift of end surface were generated.

Comparative Example 4

Film and a film roll were obtained by the same method as described in Example 1 except that molten substance of mixed resin was extruded from a T-die at a shearing rate of 180 sec$^{-1}$. Manufacturing conditions of the film and the film roll are shown in Table 2, and the evaluation results are shown in Table 3. As the evaluation results shows, thickness unevenness of the film in both width and longitudinal directions was bad, and wrinkles around a winding core of the film roll were generated.

Comparative Example 5

Film and film roll were obtained by the same method as described Example 1 except that the drawing gap of longitudinal drawing was 500 mm. Manufacturing conditions of the film and the film roll are shown in Table 2, and the evaluation results are shown in Table 3. As the evaluation results shows, thickness unevenness of the film in the width direction was bad, and wrinkles around a winding core of the film roll was generated.

Comparative Example 6

Film and a film roll were produced in the same method as described in Example 1 until the film forming process of drawing and an intermediate product roll was obtained. Slitting was started under the slitting condition of 60 N/m of an initial tension and 200 N/m of an initial surface pressure. Tension was decreased at a rate of 0.140 N/m from the winding length of 500 m to 11200 m. From the winding length of 11200 m to 12000, tension was set to 45 N/m, 75% of the initial tension. Slitting was carried out so that surface pressure became fixed at 200 N/m.

Manufacturing conditions of the film and the film roll are shown in Table 2, and the evaluation results are shown in Table 3. The obtained film roll had low winding hardness in surface layer. In addition, the film roll had wrinkles generated around a winding core, and shift of end surface was also generated.

Comparative Example 7

Film and a film roll were produced in the same method as described Example 1 until the film forming process of drawing and an intermediate roll product was obtained. Slitting was started under the slitting condition of 80 N/m of an initial tension and 180 N/m of an initial surface pressure. Tension was decreased at a rate of 0.003 N/m by the end of the wound film so that the tension at the end of winding became 44 N/m, 55% of the initial tension. Surface pressure was increased at a rate of 0.017 N/m so that the surface pressure at the end of winding became 380 N/m, 211% of the initial surface pressure.

Manufacturing conditions of the film and the film roll are shown in Table 2, and the evaluation results are shown in Table 3. The obtained film roll had large gap difference of a paper pipe, and wrinkles around a winding core was generated as a result.

TABLE 2

| | Raw materials | | | | | Glass | | Lateral drawing | |
| --- | --- | --- | --- | --- | --- | --- | --- | --- | --- |
| | Mixing ratio of polyester | | | | Amorphous components | transition temperature | Extrusion Shear rate | Drawing temperature | Drawing |
| | 1 | 2 | 3 | 4 | (mol %) | (° C.) | (sec−1) | (° C.) | ratio |
| Example 1 | 23 | 7 | 60 | 10 | 18 | 69 | 440 | w/o drawing | |
| Example 2 | 3 | 7 | 66 | 24 | 20 | 62 | 400 | w/o drawing | |
| Example 3 | 20 | 7 | 53 | 20 | 16 | 63 | 420 | w/o drawing | |
| Example 4 | 23 | 7 | 60 | 10 | 18 | 69 | 290 | w/o drawing | |
| Example 5 | 23 | 7 | 60 | 10 | 18 | 69 | 440 | w/o drawing | |
| Example 6 | 23 | 7 | 60 | 10 | 18 | 69 | 440 | 92 | 4.0 |
| Example 7 | 23 | 7 | 60 | 10 | 18 | 69 | 440 | w/o drawing | |
| Example 8 | 23 | 7 | 60 | 10 | 18 | 69 | 440 | w/o drawing | |
| Comparative Example 1 | 23 | 7 | 60 | 10 | 18 | 69 | 440 | w/o drawing | |
| Comparative Example 2 | 23 | 7 | 60 | 10 | 18 | 69 | 440 | w/o drawing | |
| Comparative Example 3 | 23 | 7 | 60 | 10 | 18 | 69 | 440 | w/o drawing | |
| Comparative Example 4 | 23 | 7 | 60 | 10 | 18 | 69 | 180 | w/o drawing | |
| Comparative Example 5 | 23 | 7 | 60 | 10 | 18 | 69 | 440 | w/o drawing | |
| Comparative Example 6 | 23 | 7 | 60 | 10 | 18 | 69 | 440 | w/o drawing | |
| Comparative Example 7 | 23 | 7 | 60 | 10 | 18 | 69 | 440 | w/o drawing | |

TABLE 2-continued

| | Longitudinal drawing | | | Heat treatment Temperature (° C.) | Slit conditions | | | |
|---|---|---|---|---|---|---|---|---|
| | Drawing temperature (° C.) | Drawing ratio | Drawing gap (mm) | | Initial tension (N/m) | End tension (N/m) | Initial surface pressure (N/m) | End surface pressure (N/m) |
| Example 1 | 90 | 4.5 | 150 | 80 | 110 | 70 | 350 | 350 |
| Example 2 | 85 | 4.5 | 150 | 80 | 110 | 70 | 350 | 350 |
| Example 3 | 87 | 4.5 | 150 | 80 | 110 | 70 | 350 | 350 |
| Example 4 | 90 | 4.5 | 150 | 80 | 110 | 70 | 350 | 350 |
| Example 5 | 90 | 4.5 | 250 | 80 | 110 | 70 | 350 | 350 |
| Example 6 | 90 | 2.5 | 250 | 80 | 110 | 70 | 350 | 350 |
| Example 7 | 92 | 4.5 | 150 | 83 | 110 | 70 | 350 | 350 |
| Example 8 | 90 | 4.5 | 150 | 80 | 110 | 70 | 350 | 350 |
| Comparative Example 1 | 90 | 4.5 | 150 | 80 | 110 | 70 | 350 | 350 |
| Comparative Example 2 | 90 | 4.5 | 150 | 80 | 110 | 70 | 350 | 350 |
| Comparative Example 3 | 90 | 4.5 | 150 | N/A | 110 | 70 | 350 | 350 |
| Comparative Example 4 | 90 | 4.5 | 150 | 80 | 110 | 70 | 350 | 350 |
| Comparative Example 5 | 90 | 4.5 | 500 | 80 | 110 | 70 | 350 | 350 |
| Comparative Example 6 | 90 | 4.5 | 150 | 80 | 60 | 45 | 200 | 200 |
| Comparative Example 7 | 90 | 4.5 | 150 | 80 | 80 | 44 | 180 | 380 |

TABLE 3

| | Film roll width (mm) | Film roll winding lenth (m) | Average thickness (μm) | Shrinkage in longitudinal direction at 90° C. (%) | Natural shrinkage in longitudinal direction (%) | Shrinkage stress in longitudinal direction (MPa) | Thickness unevenness of surfsce layer of film roll in longitudinal direction (%) | Maximum value of thickness unevenness in longitudinal direction of film at every 1000 m, measurement starting at 1000 m far from surface layer of film roll to winding core (%) | Thickness unevenness of film roll in longitudinal direction (%) |
|---|---|---|---|---|---|---|---|---|---|
| Example 1 | 1100 | 12000 | 15 | 61 | 0.42 | 10.2 | 8 | 8.5 | 9.8 |
| Example 2 | 1100 | 12000 | 15 | 68 | 0.55 | 6.4 | 11.1 | 12.9 | 12.3 |
| Example 3 | 1100 | 12000 | 15 | 63 | 0.44 | 8.9 | 8.7 | 9.1 | 12.3 |
| Example 4 | 1100 | 12000 | 15 | 60 | 0.43 | 10.2 | 10 | 11.2 | 11.9 |
| Example 5 | 1100 | 12000 | 15 | 58 | 0.41 | 8.8 | 8.9 | 10.3 | 13.4 |
| Example 6 | 2200 | 12000 | 15 | 51 | 0.32 | 7.9 | 6.1 | 6.6 | 14.2 |
| | 1100 | 12000 | 15 | 52 | 0.33 | 7.8 | 6 | 6.2 | 15.2 |
| | 200 | 12000 | 15 | 51 | 0.32 | 8 | 6 | 6.2 | 14.8 |
| Example 7 | 1100 | 12000 | 25 | 59 | 0.41 | 10.1 | 8 | 8.6 | 9.9 |
| Example 8 | 1100 | 24000 | 15 | 61 | 0.42 | 10.1 | 8 | 8.4 | 9.8 |
| Comparative Example 1 | 1100 | 12000 | 15 | 61 | 0.42 | 10.2 | 8 | 9.1 | 9.9 |
| Comparative Example 2 | 1100 | 12000 | 15 | 61 | 0.42 | 10.2 | 8 | 9 | 9.7 |
| Comparative Example 3 | 1100 | 12000 | 15 | 68 | 2.2 | 17.1 | 8.2 | 9.2 | 9.7 |
| Comparative Example 4 | 1100 | 12000 | 15 | 60 | 0.42 | 10.1 | 29.3 | 30.2 | 27.8 |
| Comparative Example 5 | 1100 | 12000 | 15 | 55 | 0.39 | 8 | 22.4 | 24.6 | 7.6 |
| Comparative Example 6 | 1100 | 12000 | 15 | 61 | 0.42 | 10.1 | 8.2 | 8.9 | 9.8 |
| Comparative Example 7 | 1100 | 12000 | 15 | 60 | 0.43 | 10.1 | 7.9 | 8.4 | 9.8 |

TABLE 3-continued

| | Gap of paper pipe in width direction (mm) | | Flattering pressure strength of paper pipe (N/100 m) | | Static friction coefficient | Dynamic friction coefficient | Winding hardness of surface layer of film roll | With or w/o wrinkles around winding core (30 to 300 m from winding core) | Shift of end surfce |
|---|---|---|---|---|---|---|---|---|---|
| | Before slitting | After film removal | Before slitting | After film removal | | | | | |
| Example 1 | 0.2 | 0.3 | 2450 | 2440 | 0.48 | 0.45 | 622 | ○ | ○ |
| Example 2 | 0.2 | 0.2 | 2450 | 2430 | 0.49 | 0.47 | 596 | ○ | ○ |
| Example 3 | 0.2 | 0.3 | 2450 | 2440 | 0.49 | 0.45 | 612 | ○ | ○ |
| Example 4 | 0.2 | 0.3 | 2450 | 2410 | 0.49 | 0.47 | 620 | ○ | ○ |
| Example 5 | 0.2 | 0.2 | 2450 | 2420 | 0.48 | 0.44 | 612 | ○ | ○ |
| Example 6 | 0.2 | 0.3 | 2450 | 2440 | 0.49 | 0.46 | 614 | ○ | ○ |
| | 0.1 | 0.2 | 2450 | 2440 | 0.49 | 0.45 | 620 | ○ | ○ |
| | 0.1 | 0.1 | 2450 | 2440 | 0.48 | 0.46 | 610 | ○ | ○ |
| Example 7 | 0.2 | 0.4 | 2450 | 2440 | 0.49 | 0.44 | 644 | ○ | ○ |
| Example 8 | 0.2 | 0.4 | 2450 | 2411 | 0.48 | 0.43 | 590 | ○ | ○ |
| Comparative Example 1 | 0.2 | 0.9 | 1490 | 1380 | 0.51 | 0.47 | 622 | x | x |
| Comparative Example 2 | 0.6 | 0.8 | 2450 | 2440 | 0.48 | 0.46 | 612 | x | x |
| Comparative Example 3 | 0.2 | 0.7 | 2450 | 2020 | 0.49 | 0.44 | 618 | x | x |
| Comparative Example 4 | 0.1 | 0.2 | 2450 | 2430 | 0.49 | 0.47 | 593 | x | ○ |
| Comparative Example 5 | 0.1 | 0.1 | 2450 | 2430 | 0.48 | 0.45 | 604 | x | ○ |
| Comparative Example 6 | 0.1 | 0.1 | 2450 | 2440 | 0.49 | 0.46 | 402 | x | x |
| Comparative Example 7 | 0.2 | 0.7 | 2450 | 2410 | 0.47 | 0.45 | 612 | x | ○ |

INDUSTRIAL APPLICABILITY

The heat-shrinkable polyester film roll of the present invention is excellent in that the film has no wrinkles around a winding core and no shift of end surface, therefore the film can be preferably used at the process such as printing.

The invention claimed is:

1. A film roll of heat-shrinkable polyester film obtained by winding around a paper pipe with heat-shrinkable polyester film having a longitudinal direction as a main shrinkage direction,
   wherein the polyester film has a shrinkage of 40% or more in the main shrinkage direction after a treatment in hot water of 90° C. for 10 seconds,
   wherein the polyester film is obtained from a polyester comprising
   (a) 50 mol % or more of ethylene terephthalate based on 100 mol % total constituent components of the polyester,
   (b) 0-3 mol % of one or more aliphatic dicarboxylic acids based on 100 mol % total polycarboxylic acid content, and
   (c) 14 mol % or more of one or more monomers which can form an amorphous component based on 100 mol % total polyhydric alcohol content or 100 mol % total polycarboxylic acid content,
   wherein the monomers which can form an amorphous component are selected from the group consisting of neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol,
   wherein the polyester has a glass transition temperature (Tg) of 60° C. to 80° C., and
   wherein the film roll satisfies the following requirements (1) to (7):
   (1) a winding length of the film is 1000-30000 m;
   (2) a width of the film is 50-1500 mm;
   (3) a thickness of the film is 5-30 μm;
   (4) a thickness unevenness of the film is 20% or less over a whole width direction of the film on a surface of the film roll;
   (5) an internal diameter of the paper pipe is 3 inch, a gap difference of the paper pipe in a width direction of the paper roll is 0.5 mm or less after a removal of the film from the film roll, and a flattening pressure strength of the paper pipe is 1700 N/100 mm or more after the removal of the film;
   (6) an average winding hardness of the film in a width direction of the film is 500-850 on the surface of the film roll; and
   (7) a natural shrinkage of the film in a longitudinal direction of the film is 2.0% or less after aging the film in an atmosphere of 40° C. and 85% relative humidity for 28 days.

2. The film roll of the heat-shrinkable polyester film according to claim 1, wherein the film roll further satisfies:
   a thickness unevenness over a whole width direction of the film is 20% or less for all film samples obtained at every 1000 m of the winding length from the surface of the film roll.

3. The film roll of the heat-shrinkable polyester film according to claim 1, wherein the film roll further satisfies:
   a thickness unevenness in 30 m length in a longitudinal direction of the film is 20% or less.

4. The film roll of the heat-shrinkable polyester film according to claim 1, wherein the film roll further satisfies:
   a static friction coefficient and a dynamic friction coefficient between an outer winding surface and an inner winding surface of the heat-shrinkable polyester film is 0.1-0.8.

5. The film roll of the heat-shrinkable polyester film according to claim 1, wherein the film roll further satisfies:
a shrinkage stress in the main shrinkage direction of the heat-shrinkable polyester film is 4-16 MPa.

6. The film roll of the heat-shrinkable polyester film according to claim 2, wherein the film roll further satisfies:
a thickness unevenness in 30 m length in a longitudinal direction of the film is 20% or less.

7. The film roll of the heat-shrinkable polyester film according to claim 6, wherein the film roll further satisfies:
a static friction coefficient and a dynamic friction coefficient between an outer winding surface and an inner winding surface of the heat-shrinkable polyester film is 0.1-0.8.

8. The film roll of the heat-shrinkable polyester film according to claim 7, wherein the film roll further satisfies:
a shrinkage stress in the main shrinkage direction of the heat-shrinkable polyester film is 4-16 MPa.

* * * * *